United States Patent Office 3,036,977
Patented May 29, 1962

3,036,977
AQUEOUS DISPERSIONS OF ADHESIVE VINYL POLYMERIC MATERIALS CONTAINING CARBOXYLIC ACID ESTER ADDITIVES
Heinrich Koch and Joachim Ebigt, Frankfurt am Main, Germany, assignors to Farbwerke Hoechst Aktiengesellschaft vormals Meister Lucius & Brüning, Frankfurt am Main, Germany, a corporation of Germany
No Drawing. Filed Aug. 12, 1958, Ser. No. 754,530
Claims priority, application Germany Aug. 17, 1957
9 Claims. (Cl. 260—29.6)

The present invention relates to the application of mono- or diesters of unsaturated mono- or dicarboxylic acids for improving the adhesiveness of vinyl polymers.

It has already been known for a long time to use vinyl polymers on a large scale for bonding for example wood, cardboard, paper, or textile materials. The vinyl polymers can be used provided that they possess a sufficient adhesiveness to the corresponding substrata. In many cases the natural adhesiveness of the vinyl polymers is inadequate to perfectly solve the problems arising in practice. Difficulties crop up particularly in case flexible or rigid plastics containing plasticizers or being free of them, for example polyvinyl chloride, cellulose triacetate, copolymers of vinyl chloride with vinyl acetate, polyamides etc. are to be bonded. The adhesiveness and the permanent stability of the bondings obtained are not satisfactory.

In industry a number of steps are known to improve the adhesiveness of the bondings. The polymers used as adhesive are admixed, for example with solvents to bring about a swelling of the substratum and thus to improve the connection between substratum and the adhesive applied thereto. The attainable success involves, however, a number of serious disadvantages. All solvents, except a few ones, are physiologically objectionable and cause damages of the skin, the respiratory organs etc. of persons getting in touch with them. Apart from these undesired physiological secondary effects, the solvents often bring about an intolerable alteration of the substratum. The solvents are added, as already mentioned, to effect swelling of the substratum. The swelling process is, however, associated with an increase in volume which may be considerable in many cases. When cut plastic pieces are bonded joint by joint in the swollen state to a rigid substratum they adopt again their initial dimensions after the complete evaporation of the solvent. In case an adhesive is used which has a high natural strength the adhesion seam is therefore liable to considerable stress or if the adhesive does not resist to said stress slits are formed between the individual plastic pieces.

In order to avoid the addition of a solvent it is likewise possible to use as adhesives vinyl polymers or copolymers which are very sticky due to the degree of plasticizing or the composition of the copolymers. In some cases the glues thus prepared have a satisfactory adhesiveness but the film produced therefrom has too poor a strength.

In order to obtain a special technical effect the adhesives are partially admixed with high amounts of fillers. In this case there is not only required a good binding strength but also a high adhesiveness of the glue to the substrata. In many cases the addition of high amounts of fillers strongly reduces, however, the adhesiveness.

Now we have found that small amounts of about 0.5–5% and preferably 3–5%, calculated on the polymer or copolymer contained in the dispersion, of at least one ester of aliphatic saturated monohydric alcohols containing 1 to 8 carbon atoms in a straight or branched chain, preferably those which contain 2 to 4 carbon atoms, with unsaturated monocarboxylic acids and/or at least one diester of aliphatic saturated monohydric alcohols containing 1 to 8 carbon atoms in a straight or branched chain, preferably those which contain 2 to 4 carbon atoms, with unsaturated dicarboxylic acids incorporated into aqueous dispersions of homo- and copolymers of vinyl compounds, considerably improve the adhesiveness of filled and unfilled films, which may contain a plasticizer and are produced from aqueous dispersions of said polymers by evaporation of the water. As examples for the unsaturated monocarboxylic and dicarboxylic acids there may be mentioned crotonic acid, cinnamic acid, itaconic acid, fumaric acid, maleic acid. In some cases higher or smaller amounts of the aforesaid esters may be used. The dispersions mentioned shall contain, in general, 30–70% of polymer or copolymer, calculated on the weight of the dispersion. In special cases and in order to comply with special requirements of application dispersions may be employed containing larger or smaller amounts of dispersed polymer or copolymer. In some cases it may be of advantage to add to the dispersions small amounts of organic solvents, for example hexylene glycol, methylisobutyl ketone or octyl alcohol. By the addition of esters of unsaturated mono- or dicarboxylic acids it is, of course, likewise possible to improve the adhesiveness of mixtures of two or more different dispersions.

As suitable polymers which may be used in the process of the invention for the preparation of adhesives having an improved adhesiveness there are mentioned, for example, polymers of vinyl esters such as vinyl acetate, vinyl propionate, vinyl butyrate; of vinyl ethers such as ethyl and isobutyl vinyl ether; of acrylic or methacrylic esters with aliphatic alcohols having a straight or branched chain of 1–6 carbon atoms. In addition to the homopolymers the copolymers of the aforesaid compounds are likewise suitable. The aforesaid monomers which are polymerized either alone or in admixture with one another can be polymerized with other monomers, such as vinyl chloride, for example in an amount of up to 30% by weight calculated on the total amount of monomers, maleic acid esters, fumaric acid esters of aliphatic saturated monohydric alcohols containing 1 to 8 carbon atoms in a straight or branched chain, preferably those which contain 2–4 carbon atoms, for example in an amount of up to 50% by weight calculated on the total amount of monomers.

As suitable plasticizers for the polymers used in the process of the invention there may be employed esters of phosphoric acid such as tricresyl phosphate, tributyl phosphate, diphenylcresyl phosphate, esters of phthalic acid such as dibutyl phthalate, dicyclohexyl phthalate and dimethylglycol phthalate, esters of adipic acid such as dibutyl adipate, dihexyl and dioctyl adipate, esters of sebacic acid such as diethylhexyl sebacate, dibutyl and dihexyl sebacates, esters of lauric acid such as diethyl, dibutyl, phenoxyethyl laurates, esters of stearic acid such as n-butyl stearate, isobutyl stearate. The plasticizers are suitably used in an amount of up to 40% by weight calculated on the polymer. In special cases larger amounts of plasticizer may be used.

The adhesiveness of the polymers described above is not only improved in case they are used as glues between rigid and flexible plastics and absorbing substrata but also in case the polymers are used as binders for organic fillers, for example peat, sawdust, wood borings, cork powder, textile fibers or waste of textile fibers from natural materials such as wool, cotton, cocos fibers, flax, bast and synthetic materials such as polyamides, polyesters and for inorganic fillers such as stone powder, mica powder, slag, glass powder and glass fibers, heavy spar, fluor spar, titanium dioxide, lithopone, i.e. a mixture of barium sulfate and zinc sulfide, iron oxides, chromium oxides, which are applied as a thin layer having for example a thickness of about 0.1–0.5 mm. or in some cases as a thick layer having for example a thickness of about 0.5–3.0 mm. when, in addition to a good binding strength between the particles of the filler, there is also required a high adhesiveness and connection of the filler to the coated substratum, for example metals such as iron or aluminum and furthermore wood, cardboard, concrete, plaster of Paris or tightly woven textile materials.

The following examples serve to illustrate the invention but they are not intended to limit it thereto, the parts being by weight unless otherwise stated.

*Example 1*

100 parts of an aqueous dispersion of 55% strength of a copolymer of vinyl acetate with maleic acid dibutyl ester in a proportion of 60:40 were admixed with 3 parts of maleic acid dibutyl ester. The adhesive thus obtained bonded polyvinyl chloride webs, films and sheets to absorbing substrata such as paper, cardboard, textile materials, plaster, concrete and wood in so good a manner that they could only be separated by rupture of the material.

*Example 2*

With the mixture described in Example 1 films of cellulose triacetate, regenerated cellulose and super-polyamides were bonded to absorbing substrata such as paper, cardboard and the like. Also in this case a separation was only possible with rupture of the material.

*Example 3*

With the mixture described in Example 1 two polyvinyl chloride films were bonded together. The thickness of the films was chosen in a manner such that the moisture of the adhesive could migrate through the film. After complete drying a separation of the films was only possible with strong deformation of the films.

*Example 4*

The mixture described in Example 1 was dried on polyvinyl chloride foils to form a film. After complete drying the foils were applied by heat and pressure to non absorbing substrata, for example metal, plastic or stone plates. A separation was only possible with destruction of the material.

*Example 5*

5 parts of maleic acid dibutyl ester were added to 100 parts of an aqueous dispersion containing 43 parts of polyvinyl acetate and 11 parts of dibutyl phthalate as plasticizer. Said mixture was admixed with 200 parts of an inorganic filler, for example mica, and dried, after homogenization, in the form of a thick layer on a lacquered iron plate. The adhesion of the sheet-like material to the substratum is considerably improved as compared with mixtures without addition of maleic acid dibutyl ester.

*Example 6*

An adhesive was prepared from 100 parts of an aqueous dispersion of 55% strength of a copolymer from vinyl acetate and maleic acid dibutyl ester in a proportion of 60:40 and 5 parts of cinnamic acid ethyl ester. The mixture bonded polyvinyl chloride webs, foils and sheets to absorbing substrata such as paper, cardboard, textile materials, plaster, concrete and wood in so good a manner that they could only be separated with rupture of the material.

*Example 7*

An adhesive was prepared from 100 parts of an aqueous dispersion of 55% strength of a copolymer from vinyl acetate and maleic acid dibutyl ester in a proportion of 60:40 and 3 parts of crotonic acid propyl ester. The mixture thus obtained bonded polyvinyl chloride webs, foils and sheets to absorbing substrata such as paper, cardboard, textile materials, plaster, concrete and wood in so good a manner that they could only be separated with rupture of the material.

*Example 8*

100 parts of an aqueous dispersion of 55% strength of a copolymer from vinyl acetate and maleic acid dibutyl ester in a proportion of 60:40 were admixed with 4 parts of fumaric acid dibutyl ester. The adhesive thus obtained bonded polyvinyl chloride webs, foils and sheets to absorbing substrata such as paper, cardboard, textile materials, plaster, concrete and wood in so good a manner that they could only be separated with rupture of the material.

We claim:

1. Aqueous dispersions yielding, after evaporation of water therefrom, an adhesive material with improved adhesiveness, said aqueous dispersions comprising at least one member selected from the group consisting of homopolymers of monomers of of vinyl acetate, vinyl propionate, vinyl butyrate, vinyl ethyl ether, vinyl isobutyl ether, acrylic esters of saturated aliphatic monohydric alcohols with 1 to 8 carbon atoms, methacrylic esters of saturated aliphatic monohydric alcohols with 1 to 8 carbon atoms, copolymers consisting essentially of said monomers, copolymers of said monomers with up to 30 percent, calculated upon the total weight of monomers, of vinyl chloride, and copolymers of said monomers with up to 50 percent, calculated upon the total weight of monomers, of a member selected from the group consisting of maleic acid esters and fumaric acid esters of saturated aliphatic monohydric alcohols with 1 to 8 carbon atoms; and about 0.5 to 5 percent, calculated on the weight of polymer, of at least one member selected from the group consisting of monoesters of saturated aliphatic monohydric alcohols containing 1 to 8 carbon atoms with monocarboxylic olefinically unsaturated acids with up to 9 carbon atoms, and diesters of saturated aliphatic monohydric alcohols containing 1 to 8 carbon atoms with aliphatic olefinically unsaturated dicarboxylic acids with up to 5 carbons atoms.

2. Aqueous dispersions yielding, after evaporation of water therefrom, an adhesive material with improved adhesiveness, said aqueous dispersions comprising at least one member selected from the group consisting of homopolymers of monomers of vinyl acetate, vinyl propionate, vinyl butyrate, vinyl ethyl ether, vinyl isobutyl ether, acrylic esters of saturated aliphatic monohydric alcohols with 1 to 8 carbon atoms, methacrylic esters of saturated aliphatic monohydric alcohols with 1 to 8 carbon atoms, copolymers consisting essentially of said monomers, copolymers of said monomers with up to 30 percent, calculated upon the total weight of monomers, of vinyl chloride, and copolymers of said monomers with up to 50 percent, calculated upon the total weight of monomers, of a member selected from the group consisting of maleic acid esters and fumaric acid esters of saturated aliphatic monohydric alcohols with 1 to 8 carbon atoms; and about 0.5 to 5 percent, calculated on the weight of polymer, of at least one ester of crotonic acid with a saturated aliphatic monohydride alcohol with 1 to 8 carbon atoms.

3. Aqueous dispersions yielding, after evaporation of water therefrom, an adhesive material with improved adhesiveness, said aqueous dispersions comprising at least one member selected from the group consisting of homopolymers of monomers of vinyl acetate, vinyl propionate, vinyl butyrate, vinyl ethyl ether, vinyl isobutyl ether, acrylic esters of saturated aliphatic monohydric alcohols with 1 to 8 carbon atoms, methacrylic esters of saturated aliphatic monohydric alcohols with 1 to 8 carbon atoms, copolymers consisting essentially of said monomers, copolymers of said monomers with up to 30 percent, calculated upon the total weight of monomers, of vinyl chloride, and copolymers of said monomers with up to 50 percent, calculated upon the total weight of monomers, of a member selected from the group consisting of maleic acid esters and fumaric acid esters of saturated aliphatic monohydric alcohols with 1 to 8 carbon atoms; and about 0.5 to 5 percent, calculated on the weight of polymer, of at least one ester of cinnamic acid with a saturated aliphatic monohydric alcohol with 1 to 8 carbon atoms.

4. Aqueous dispersions yielding, after evaporation of water therefrom, an adhesive material with improved adhesiveness, said aqueous dispersions comprising at least one member selected from the group consisting of homopolymers of monomers of vinyl acetate, vinyl propionate, vinyl butyrate, vinyl ethyl ether, vinyl isobutyl ether, acrylic esters of saturated aliphatic monohydric alcohols with 1 to 8 carbon atoms, methacrylic esters of saturated aliphatic monohydric alcohols with 1 to 8 carbon atoms, copolymers consisting essentially of said monomers, copolymers of said monomers with up to 30 percent, calculated upon the total weight of monomers, of vinyl chloride, and copolymers of said monomers with up to 50 percent, calculated upon the total weight of monomers, of a member selected from the group consisting of maleic acid esters and fumaric acid esters of saturated aliphatic monohydric alcohols with 1 to 8 carbon atoms; and about 0.5 to 5 percent, calculated on the weight of polymer, of at least one ester of itaconic acid with a saturated aliphatic monohydric alcohol with 1 to 8 carbon atoms.

5. Aqueous dispersions yielding, after evaporation of water therefrom, an adhesive material with improved adhesiveness, said aqueous dispersions comprising at least one member selected from the group consisting of homopolymers of monomers of vinyl acetate, vinyl propionate, vinyl butyrate, vinyl ethyl ether, vinyl isobutyl ether, acrylic esters of saturated aliphatic monohydric alcohols with 1 to 8 carbon atoms, methacrylic esters of saturated aliphatic monohydric alcohols with 1 to 8 carbon atoms, copolymers consisting essentially of said monomers, copolymers of said monomers with up to 30 percent, calculated upon the total weight of monomers, of vinyl chloride, and copolymers of said monomers with up to 50 percent, calculated upon the total weight of monomers, of a member selected from the group consisting of maleic acid esters and fumaric acid esters of saturated aliphatic monohydric alcohols with 1 to 8 carbon atoms; and about 0.5 to 5 percent, calculated on the weight of polymer, of at least one ester of maleic acid with a saturated aliphatic monohydric alcohol with 1 to 8 carbon atoms.

6. Aqueous dispersions yielding, after evaporation of water therefrom, an adhesive material with improved adhesiveness, said aqueous dispersions comprising at least one member selected from the group consisting of homopolymers of monomers of vinyl acetate, vinyl propionate, vinyl butyrate, vinyl ethyl ether, vinyl isobutyl ether, acrylic esters of saturated aliphatic monohydric alcohols with 1 to 8 carbon atoms, methacrylic esters of saturated aliphatic monohydric alcohols with 1 to 8 carbon atoms, copolymers consisting essentially of said monomers, copolymers of said monomers with up to 30 percent, calculated upon the total weight of monomers, of vinyl chloride, and copolymers of said monomers with up to 50 percent, calculated upon the total weight of monomers, of a member selected from the group consisting of maleic acid esters and fumaric acid esters of saturated aliphatic monohydric alcohols with 1 to 8 carbon atoms; and about 0.5 to 5 percent, calculated on the weight of polymer, of at least one ester of fumaric acid with a saturated aliphatic monohydric alcohol with 1 to 8 carbon atoms.

7. An aqueous dispersion according to claim 1 comprising up to 40%, calculated on the weight of polymer, of a plasticizer selected from the group consisting of esters of phosphoric acid, phthalic acid, adipic acid, sebacic acid, and stearic acid.

8. A dispersion as claimed in claim 1 additionally containing an organic filler.

9. A dispersion as claimed in claim 1 additionally containing an inorganic filler.

References Cited in the file of this patent
UNITED STATES PATENTS

| | | |
|---|---|---|
| 2,486,756 | Murphy | Nov. 1, 1949 |
| 2,838,437 | Busse et al. | June 10, 1958 |
| 2,840,447 | Green | June 24, 1958 |
| 2,855,374 | Herrmann et al. | Oct. 7, 1958 |
| 2,858,289 | Bohn et al. | Oct. 28, 1958 |
| 2,859,200 | Lappala | Nov. 4, 1958 |